US009507936B2

(12) United States Patent
Hoog (10) Patent No.: US 9,507,936 B2
(45) Date of Patent: Nov. 29, 2016

(54) SYSTEMS, METHODS, APPARATUSES, AND COMPUTER PROGRAM PRODUCTS FOR FORENSIC MONITORING

(71) Applicant: viaForensics, LLC, Oak Park, IL (US)

(72) Inventor: Andrew W. Hoog, Oak Park, IL (US)

(73) Assignee: viaForensics, LLC, Oak Park, IL (US)

( * ) Notice: Subject to any disclaimer, the term of this patent is extended or adjusted under 35 U.S.C. 154(b) by 0 days.

(21) Appl. No.: 14/326,008

(22) Filed: Jul. 8, 2014

(65) Prior Publication Data

US 2014/0325661 A1 Oct. 30, 2014

Related U.S. Application Data

(63) Continuation of application No. 13/358,782, filed on Jan. 26, 2012, now abandoned.

(60) Provisional application No. 61/436,384, filed on Jan. 26, 2011.

(51) Int. Cl.
| | |
|---|---|
| *G06F 17/00* | (2006.01) |
| *G06F 21/55* | (2013.01) |
| *G06F 17/30* | (2006.01) |
| *H04L 29/06* | (2006.01) |

(52) U.S. Cl.
CPC ....... *G06F 21/552* (2013.01); *G06F 17/30575* (2013.01); *H04L 63/1433* (2013.01)

(58) Field of Classification Search
CPC ............... G06F 17/30575; G06F 17/30684; G06F 21/552; G06F 17/3064; H04L 63/1433
USPC ................. 707/661, 999.204, 999.102, 667
See application file for complete search history.

(56) References Cited

U.S. PATENT DOCUMENTS

| 6,363,391 | B1 | 3/2002 | Rosensteel, Jr. | |
|---|---|---|---|---|
| 7,577,701 | B1 | 8/2009 | Johns et al. | |
| 7,921,284 | B1 | 4/2011 | Kinghorn et al. | |
| 8,549,642 | B2 * | 10/2013 | Lee ........................ | H04L 12/585 709/203 |
| 8,793,151 | B2 * | 7/2014 | DelZoppo .......... | G06Q 10/0635 705/7.28 |
| 2005/0229250 | A1 * | 10/2005 | Ring ....................... | G06F 21/57 726/23 |
| 2008/0065811 | A1 * | 3/2008 | Jahangiri .............. | H04L 63/123 711/100 |
| 2008/0082585 | A1 | 4/2008 | Elgezabal | |
| 2008/0229420 | A1 * | 9/2008 | Jeschke ............... | H04L 63/1433 726/25 |
| 2010/0023364 | A1 * | 1/2010 | Torvmark ............ | G06Q 10/063 705/7.11 |
| 2011/0179487 | A1 * | 7/2011 | Lee ........................ | H04L 12/585 726/23 |
| 2012/0310895 | A1 * | 12/2012 | Hoog ................ | G06F 17/30569 707/675 |

OTHER PUBLICATIONS

Pennock, J. et al., Design and Implementation of a Remote Forensics System, May 2, 2005, Information Networking Institute, Carnegie Mellon University; (Foundstone, Inc.) 1-58.*
International Search Report and Written Opinion from International Application No. PCT/US2012/022576 dated Apr. 20, 2012.

* cited by examiner

*Primary Examiner* — Phong Nguyen
(74) *Attorney, Agent, or Firm* — Alston & Bird LLP (57) ABSTRACT

Systems, methods, apparatuses, and computer program products are provided for forensic monitoring. A system may include a forensic analysis apparatus and one or more monitored apparatuses. A monitored apparatus may monitor activity on the monitored apparatus and extract forensic data based at least in part on monitored activity. The forensic data may be transferred from the monitored apparatus to the forensic analysis apparatus for processing and analysis.

25 Claims, 8 Drawing Sheets

| liveForensics Report: USB Storage --demo-- | | | |
|---|---|---|---|
| System: WINXP-WKS-001, Monitor Date: MM/DD/YYYY 4:03:52 PM | | | |
| Device | Monitor Date | Device Name | Mount Point |
| 00012238198&0 | MM/DD/YYYY 5:00 AM | WIBU - CodeMeter-Stick USB Device | **** |
| 080716104e21918&0 | MM/DD/YYYY 4:03:52 PM | Ut163 USB2FlashStorage USB Device | |
| | MM/DD/YYYY 5:00:05 AM | Ut163 USB2FlashStorage USB Device | \DosDevices\F: |
| 09050957d2d6f7&0 | MM/DD/YYYY 5:00 AM | USB Device | |
| 09092706248BD2&0 | MM/DD/YYYY 4:03:52 PM | USB Device | \DosDevices\F: |

SYSTEMS, METHODS, APPARATUSES, AND COMPUTER PROGRAM PRODUCTS FOR FORENSIC MONITORING

CROSS-REFERENCE TO RELATED APPLICATIONS

The present application claims priority to U.S. Provisional Patent Application No. 61/436,384, filed Jan. 26, 2011, the contents of which are hereby incorporated by reference.

The present application is a Continuation Application of U.S. patent application Ser. No. 13/358,782, filed Jan. 26, 2012, which is incorporated herein by reference.

TECHNOLOGICAL FIELD

Embodiments of the present invention relate generally to computing technology and, more particularly, relate to systems, methods, apparatuses, and computer program products for forensic monitoring.

BACKGROUND

Digital forensics, also known as computer forensics, is generally concerned with evidence of activities or occurrences on digital systems. This evidence may be found by examining storage media (e.g. hard disk drives) and/or memory (e.g. RAM). In this regard, digital forensics techniques may be applied to identify, examine, and analyze forensic data in a manner that may preserve the integrity of the information and maintain a strict chain of custody for the data. Analysis of forensic data may be used to support the investigation of crimes, violations of policies, security incidents, reviews of operational problems, and recovery from accidental system damage.

Many organizations today utilize numerous computer systems. Often questions arise regarding activities on those systems, especially as related to legal proceedings or investigations. These questions may relate to an "incident" such as a data breach (for example, an employee, outsider or program accessing data she or he should not) or system compromise (for example, infection by malicious software). Currently, digital forensics investigation and analysis techniques are generally applied only after an incident occurs.

BRIEF SUMMARY OF SOME EXAMPLES OF THE INVENTION

Systems, methods, apparatuses, and computer program products are provided herein for forensic monitoring. Some example embodiments disclosed herein may provide several advantages for system administrators, digital forensics analysts, computing device users, and computing devices. In this regard, some example embodiments provide a system wherein forensic data is automatically gathered from one or more monitored systems and transferred to a forensic analysis apparatus. More particularly, in some example embodiments, activity on a monitored apparatus is automatically monitored (e.g., periodically) and forensic data is transferred to a forensic analysis apparatus, which may gather forensic data over a period of time from one or more monitored apparatuses. In accordance with some such example embodiments, the forensic analysis apparatus receives the forensic data from the monitored apparatus and processes and stores the data for analysis. The forensic analysis apparatus may generate forensic reports based at least in part on the processed forensic data. Accordingly, an administrator, investigator, or other user may have access to detailed forensic reports enabling analysis of activity across one or more systems over time.

Example embodiments wherein forensic data is automatically gathered over time may advantageously mitigate the risk of loss of forensic data as compared with existing techniques wherein forensic investigation is performed only after an incident has occurred. Further, some example embodiments may utilize gathered forensic data to identify exceptions to security policies, a presence of key risk indicators (KRIs), and/or the like and may automatically generate reports indicating the identified exceptions and risks. Accordingly, an administrator may be made aware of a potential problem prior to an occurrence of an incident.

In a first example embodiment, a system for forensic monitoring and analysis is provided. The system of this example embodiment may include a forensic analysis apparatus and one or more monitored apparatuses. A monitored apparatus in accordance with this example embodiment may monitor activity on the monitored apparatus and extract forensic data based at least in part on monitored activity. The forensic data may be transferred from the monitored apparatus to the forensic analysis apparatus for processing and analysis. The forensic analysis apparatus may process the received forensic data and may generate a report based at least in part on the processed forensic data.

In another example embodiment, a method for forensic monitoring is provided. The method of this example embodiment may comprise monitoring activity on a monitored apparatus. The method of this example embodiment may further comprise extracting forensic data based at least in part on monitored activity. The method of this example embodiment may also comprise causing transfer of the extracted forensic data from the monitored apparatus to a forensic analysis apparatus for processing and analysis.

In another example embodiment, an apparatus for forensic monitoring is provided. The apparatus of this embodiment comprises at least one processor. The at least one processor may be configured to cause the apparatus of this example embodiment to monitor activity on the apparatus. The at least one processor may be further configured to cause the apparatus of this example embodiment to extract forensic data based at least in part on the monitored activity. The at least one processor may be additionally configured to cause the apparatus of this example embodiment to cause transfer of the extracted forensic data to a forensic analysis apparatus for processing and analysis.

In another example embodiment, a computer program product for forensic monitoring is provided. The computer program product of this embodiment may include at least one computer-readable storage medium having computer-readable program instructions stored therein. The program instructions of this example embodiment may comprise program instructions configured to cause an apparatus to perform a method comprising monitoring activity on a monitored apparatus. The method of this example embodiment may further comprise extracting forensic data based at least in part on monitored activity. The method of this example embodiment may also comprise causing transfer of the extracted forensic data from the monitored apparatus to a forensic analysis apparatus for processing and analysis.

In another example embodiment, an apparatus for forensic monitoring is provided. The apparatus of this example embodiment may comprise means for monitoring activity on the apparatus. The apparatus of this example embodiment may further comprise means for extracting forensic data based at least in part on monitored activity. The apparatus of this example embodiment may also comprise means for causing transfer of the extracted forensic data to a forensic analysis apparatus for processing and analysis.

In another example embodiment, a method for forensic analysis is provided. The method of this example embodiment may comprise receiving, at a forensic analysis apparatus, forensic data sent by a monitored apparatus. The method of this example embodiment may further comprise processing the received forensic data. The method of this example embodiment may also comprise generating a report based at least in part on the processed forensic data.

In another example embodiment, an apparatus for forensic analysis is provided. The apparatus of this embodiment comprises at least one processor. The at least one processor may be configured to cause the apparatus of this example embodiment to receive forensic data sent by a monitored apparatus. The at least one processor may be additionally configured to cause the apparatus of this example embodiment to process the received forensic data. The at least one processor may be further configured to cause the apparatus of this example embodiment to generate a report based at least in part on the processed forensic data.

In another example embodiment, a computer program product for forensic analysis is provided. The computer program product of this embodiment may include at least one computer-readable storage medium having computer-readable program instructions stored therein. The program instructions of this example embodiment may comprise program instructions configured to cause an apparatus to perform a method comprising receiving, at a forensic analysis apparatus, forensic data sent by a monitored apparatus. The method of this example embodiment may further comprise processing the received forensic data. The method of this example embodiment may also comprise generating a report based at least in part on the processed forensic data.

In another example embodiment, an apparatus for forensic analysis is provided. The apparatus of this example embodiment may comprise means for receiving forensic data sent by a monitored apparatus. The apparatus of this example embodiment may further comprise means for processing the received forensic data. The apparatus of this example embodiment may also comprise means for generating a report based at least in part on the processed forensic data.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Currently, digital forensics investigation and analysis techniques are generally applied only after an incident occurs. However, investigation after an incident relies on forensic evidence gathered only at the time of investigation. In this regard, the investigation may occur some period of time following the incident, and the availability of evidence may be at least somewhat limited. Further, while security monitoring systems (e.g., antivirus systems and intrusion protection systems), attempt to protect systems from malicious software by monitoring network traffic or system data for specific file signatures or attributes that indicate a suspicious or known malicious computer program, these tools are not sufficient for forensic investigation of a system. In this regard security monitoring systems fail to gather low-level system artifacts and user activity data that could be key to forensic investigation.

Some example embodiments disclosed herein may advantageously provide organizations with thorough and consistent forensic reporting on computer systems in order to protect their legal interests. In this regard, activity on a monitored system may be monitored in accordance with some example embodiments over time (e.g., periodically, continuously, or the like) and forensic data (e.g., forensic artifacts) may be extracted based on the monitored activity. In some example embodiments, the extracted forensic data may be transferred from a monitored system to a forensic analysis apparatus, while preserving data integrity and a chain of custody of the data. Accordingly, forensic data may be available for a period of time that may include periods before, during, and after an incident. Further, as in some example embodiments, forensic data is transferred to a forensic analysis apparatus, which may be a trusted and/or protected system, threats to reliability and integrity of forensic data may be mitigated. Additionally, processing of the forensic data on the forensic analysis apparatus may eliminate interference from other applications or changes that may be executed on the monitored system.

As such, some example embodiments disclosed herein may provide regular, reliable, thorough and continuous capture and transfer of forensic data from a monitored system. Such example embodiments may accordingly provide, from each capture, a point-in-time view of system state and the ability to view and compare forensic artifacts over time. As a result, more complete incident response may be possible. Rather than a forensic investigation being limited to the existing system state post-incident, the incident response analysis may include forensic data from dates/times prior to, during and immediately post-incident. Further, some example embodiments capture data not available in event log gatherers, anti-virus monitoring, intrusion detection systems, and other security products.

Additionally, some example embodiments may provide forensic results that may be consistent across systems and time. In this regard, some example embodiments provide automated extraction of forensic data and processing of forensic data. This automated extraction and processing may mitigate variance that exists in current forensic techniques wherein human-driven incident response may involve extraction that is dependent on the individual investigator's skill and preferences, which may vary from one investigation to another.

Figure 1:
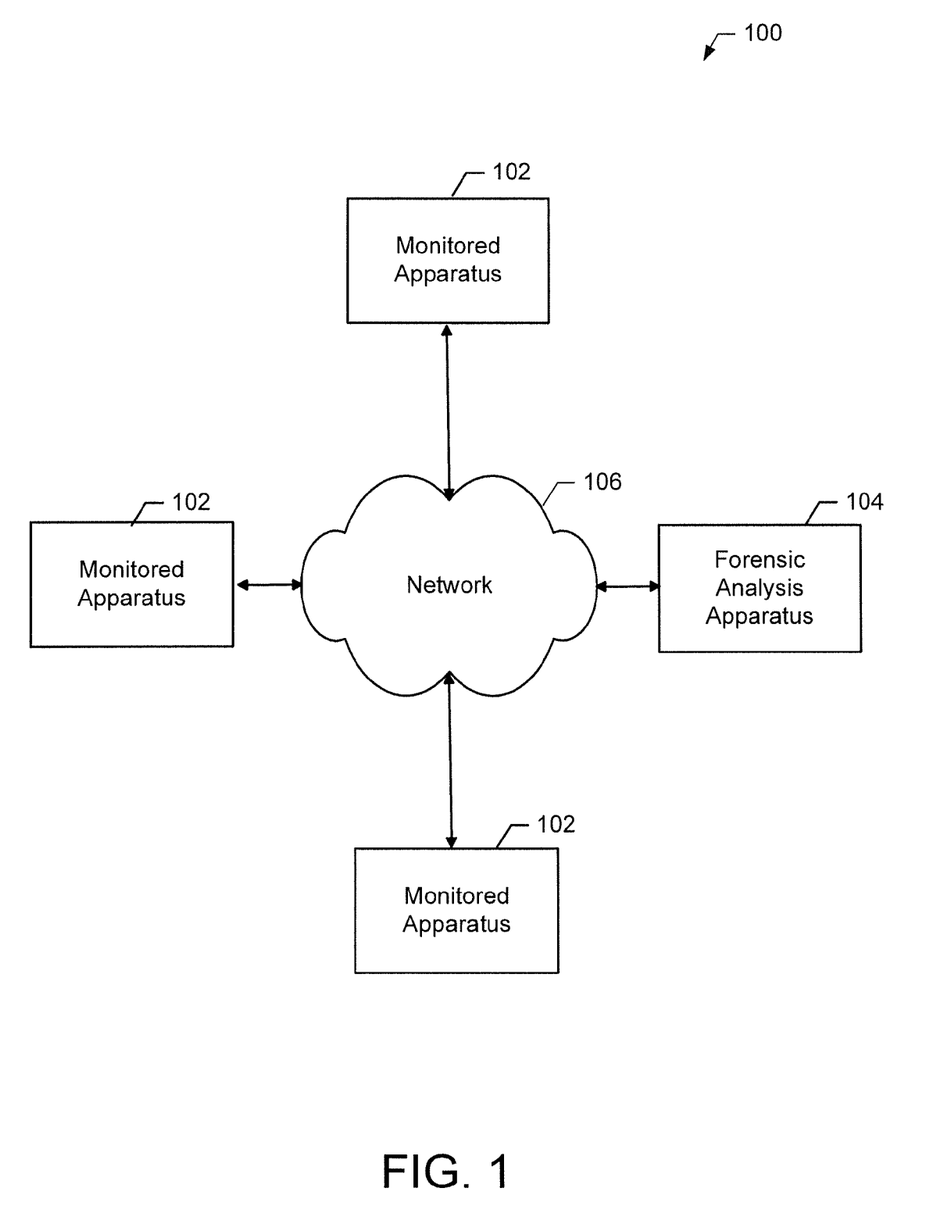
FIG. 1 illustrates a system for forensic monitoring according to some example embodiments.

Referring now to FIG. 1, a block diagram of a system 100 is shown for forensic monitoring according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for forensic monitoring, numerous other configurations may also be used to implement embodiments of the present invention.

In some example embodiments, the system 100 may include one or more monitored apparatuses 102 and a forensic analysis apparatus 104. The monitored apparatus(es) 102 and forensic analysis apparatus 104 may communicate with each other via a network 106. The network 106 may comprise one or more wireless networks (for example, a cellular network, wireless local area network, wireless personal area network, wireless metropolitan area network, and/or the like), one or more wireline networks, or some combination thereof, and in some embodiments may comprise at least a portion of the Internet.

A monitored apparatus 102 may be embodied as any computing device on which activity may be monitored in accordance with various example embodiments. A monitored apparatus 102 may, for example, be embodied as a computer, laptop computer, server, mobile terminal, mobile computer, mobile phone, mobile communication device, tablet computer, game device, digital camera/camcorder, audio/video player, television device, radio receiver, digital video recorder, positioning device, personal digital assistant (PDA), any combination thereof, and/or the like.

A forensic analysis apparatus 104 may comprise any computing device or plurality of computing devices configured to receive forensic data from a monitored apparatus 102, such as over the network 106, and process the forensic data in accordance with one or more example embodiments. A forensic analysis apparatus 104 may accordingly comprise any appropriately configured computing device or plurality of computing devices, such as one or more servers, a server cluster, one or more network nodes, a cloud computing infrastructure, a distributed apparatus, one or more desktop computers, one or more laptop computers, one or more network nodes, multiple computing devices in communication with each other, any combination thereof, and/or the like.

Figure 2:
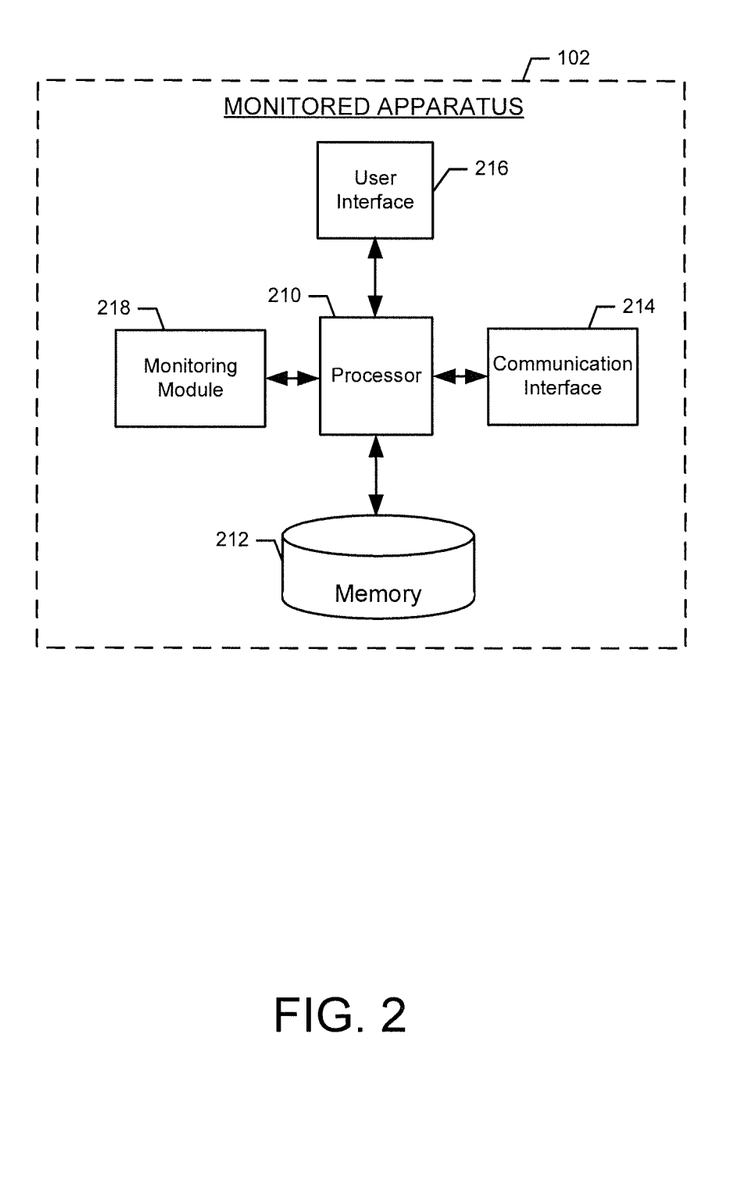
FIG. 2 illustrates a block diagram of a monitored apparatus according to some example embodiments.

Referring now to FIG. 2, a block diagram of a monitored apparatus 102 is shown according to some example embodiments. In some example embodiments, the monitored apparatus 102 may include various means for performing the various functions described herein. These means may include, for example, one or more of a processor 210, memory 212, communication interface 214, user interface 216, or monitoring module 218 for performing the various functions herein described. The means of the monitored apparatus 102 as described herein may be embodied as, for example, circuitry, hardware elements (e.g., a suitably programmed processor, combinational logic circuit, and/or the like), a computer program product comprising a computer-readable medium (e.g., memory 212) storing computer-readable program instructions (e.g., software or firmware) that are executable by a suitably configured processing device (e.g., the processor 210), or some combination thereof.

The processor 210 may, for example, be embodied as various means including one or more processors, one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 210 may comprise a plurality of processors. The plurality of processors may be embodied on a single computing device or may be distributed across a plurality of computing devices collectively configured to function as the monitored apparatus 102. The plurality of processors may be in operative communication with each other and may be collectively configured to perform one or more functionalities of the monitored apparatus 102 as described herein. In some example embodiments, the processor 210 is configured to execute instructions stored in the memory 212 and/or that are otherwise accessible to the processor 210. These instructions, when executed by the processor 210, may cause the monitored apparatus 102 to perform one or more of the functionalities of the monitored apparatus 102 as described herein. As such, whether configured by hardware or software methods, or by a combination thereof, the processor 210 may comprise an entity capable of performing operations according to one or more example embodiments while configured accordingly. Thus, for example, when the processor 210 is embodied as an ASIC, FPGA or the like, the processor 210 may comprise specifically configured hardware for conducting one or more operations described herein. Alternatively, as another example, when the processor 210 is embodied as an executor of instructions, such as may be stored in the memory 212, the instructions may specifically configure the processor 210 to perform one or more algorithms and operations described herein.

The memory 212 may include, for example, volatile and/or non-volatile memory. In this regard, the memory 212 may comprise a non-transitory computer-readable storage medium. Although illustrated in FIG. 2 as a single memory, the memory 212 may comprise a plurality of memories. The plurality of memories may be embodied on a single computing device or distributed across a plurality of computing devices. The memory 212 may comprise volatile memory, non-volatile memory, or some combination thereof. In this regard, the memory 212 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 212 may be configured to store information, data, applications, instructions, or the like for enabling the monitored apparatus 102 to carry out various functions in accordance with example embodiments of the present invention. For example, in at least some embodiments, the memory 212 is configured to buffer input data for processing by the processor 210. Additionally or alternatively, in at least some embodiments, the memory 212 is configured to store program instructions for execution by the processor 210. The memory 212 may store information in the form of static and/or dynamic information. This stored information may be stored and/or used by the monitoring module 218 during the course of performing its functionalities.

The communication interface 214 may be embodied as any device or means embodied in circuitry, hardware, a computer program product comprising a computer readable medium (e.g., the memory 212) storing computer readable program instructions that are executable by a processing device (e.g., the processor 210), or a combination thereof that is configured to receive and/or transmit data from/to another device, such as, a forensic analysis apparatus 104. In some example embodiments, the communication interface 214 is at least partially embodied as or otherwise controlled by the processor 210. In this regard, the communication interface 214 may be in communication with the processor 210, such as via a bus. The communication interface 214 may include, for example, an antenna, a transmitter, a receiver, a transceiver, a network interface card, and/or supporting hardware or software for enabling communications with another computing device. The communication interface 214 may be configured to receive and/or transmit data using any protocol that may be used for communications between computing devices. As an example, the communication interface 214 may be configured to receive and/or transmit data using any protocol that may be used for communication over the network 106. The communication interface 214 may additionally be in communication with the memory 212, user interface 216, and/or monitoring module 218, such as via a bus.

The user interface 216 may be in communication with the processor 210 to receive an indication of a user input and/or to provide an audible, visual, mechanical, or other output to a user. As such, the user interface 216 may include, for example, a keyboard, a mouse, a joystick, a display, a touch screen display, a microphone, a speaker, and/or other input/output mechanisms. Accordingly, the user interface 216 may provide means for a user to interact with and/or to otherwise engage in activity on the monitored apparatus 102, such as by inputting data to the monitored apparatus 102, viewing data output by the monitored apparatus 102, and/or the like. The user interface 216 may be in communication with the memory 212, communication interface 214, and/or monitoring module 218, such as via a bus.

The monitoring module 218 may be embodied as various means, such as circuitry, hardware, a computer program product comprising a computer-readable medium (e.g., memory 212) storing computer-readable program instructions (e.g., software or firmware) that are executable by a suitably configured processing device (e.g., the processor 210), or some combination thereof and, in some example embodiments, is embodied as or otherwise controlled by the processor 210. In embodiments wherein the monitoring module 218 is embodied separately from the processor 210, the monitoring module 218 may be in communication with the processor 210. The monitoring module 218 may further be in communication with one or more of the memory 212, communication interface 214, or user interface 216, such as via a bus.

Figure 3:
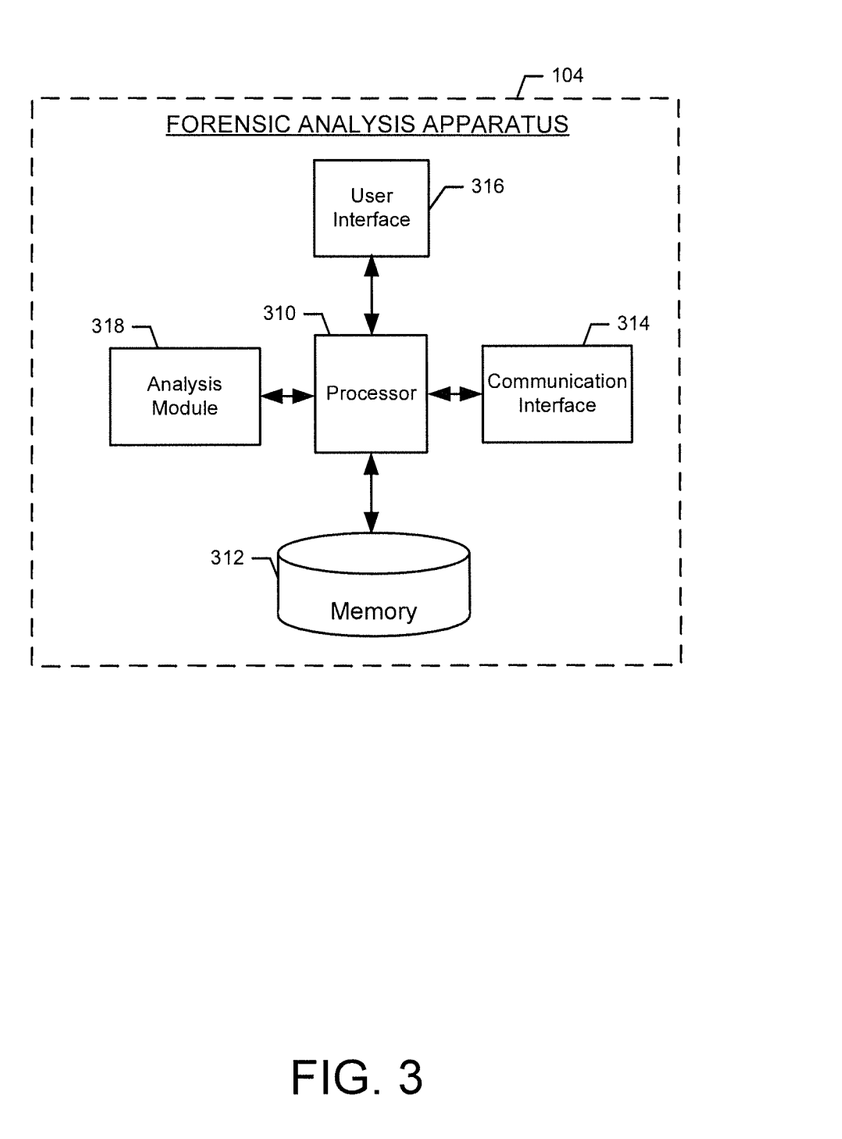
FIG. 3 illustrates a block diagram of a forensic analysis apparatus according to some example embodiments.

Referring now to FIG. 3, a block diagram of a forensic analysis apparatus 104 is shown according to some example embodiments. In some example embodiments, the forensic analysis apparatus 104 may include various means for performing the various functions described herein. These means may include, for example, one or more of a processor 310, memory 312, communication interface 314, user interface 316, or analysis module 318 for performing the various functions herein described. The means of the forensic analysis apparatus 104 as described herein may be embodied as, for example, circuitry, hardware elements (e.g., a suitably programmed processor, combinational logic circuit, and/or the like), a computer program product comprising a computer-readable medium (e.g., memory 312) storing computer-readable program instructions (e.g., software or firmware) that are executable by a suitably configured processing device (e.g., the processor 310), or some combination thereof.

The processor 310 may, for example, be embodied as various means including one or more processors, one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 310 may comprise a plurality of processors. The plurality of processors may be embodied on a single computing device or may be distributed across a plurality of computing devices collectively configured to function as the forensic analysis apparatus 104. The plurality of processors may be in operative communication with each other and may be collectively configured to perform one or more functionalities of the forensic analysis apparatus 104 as described herein. In some example embodiments, the processor 310 is configured to execute instructions stored in the memory 312 and/or that are otherwise accessible to the processor 310. These instructions, when executed by the processor 310, may cause the forensic analysis apparatus 104 to perform one or more of the functionalities of the forensic analysis apparatus 104 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an ASIC, FPGA or the like, the processor 310 may comprise specifically configured hardware for conducting one or more operations described herein. Alternatively, as another example, when the processor 310 is embodied as an executor of instructions, such as may be stored in the memory 312, the instructions may specifically configure the processor 310 to perform one or more algorithms and operations described herein.

The memory 312 may include, for example, volatile and/or non-volatile memory. In this regard, the memory 312 may comprise a non-transitory computer-readable storage medium. Although illustrated in FIG. 3 as a single memory, the memory 312 may comprise a plurality of memories. The plurality of memories may be embodied on a single computing device or distributed across a plurality of computing devices. The memory 312 may comprise volatile memory, non-volatile memory, or some combination thereof. In this regard, the memory 312 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 312 may be configured to store information, data, applications, instructions, or the like for enabling the forensic analysis apparatus 104 to carry out various functions in accordance with example embodiments of the present invention. For example, in at least some embodiments, the memory 312 is configured to buffer input data for processing by the processor 310. Additionally or alternatively, in at least some embodiments, the memory 312 is configured to store program instructions for execution by the processor 310. The memory 312 may store information in the form of static and/or dynamic information. This stored information may be stored and/or used by the analysis module 318 during the course of performing its functionalities.

The communication interface 314 may be embodied as any device or means embodied in circuitry, hardware, a computer program product comprising computer readable program instructions stored on a computer readable medium (e.g., the memory 312) that are executable by a processing device (e.g., the processor 310), or a combination thereof that is configured to receive and/or transmit data from/to another device, such as, a monitored apparatus 102. In some example embodiments, the communication interface 314 is at least partially embodied as or otherwise controlled by the processor 310. In this regard, the communication interface 314 may be in communication with the processor 310, such as via a bus. The communication interface 314 may include, for example, an antenna, a transmitter, a receiver, a transceiver, a network interface card, and/or supporting hardware or software for enabling communications with another computing device. The communication interface 314 may be configured to receive and/or transmit data using any protocol that may be used for communications between computing devices. As an example, the communication interface 314 may be configured to receive and/or transmit data using any protocol that may be used for communication over the network 106. The communication interface 314 may additionally be in communication with the memory 312, user interface 316, and/or analysis module 318, such as via a bus.

The user interface 316 may be in communication with the processor 310 to receive an indication of a user input and/or to provide an audible, visual, mechanical, or other output to a user. As such, the user interface 316 may include, for example, a keyboard, a mouse, a joystick, a display, a touch screen display, a microphone, a speaker, and/or other input/output mechanisms. In some example embodiments, such as in some embodiments wherein the forensic analysis apparatus is embodied as a server, aspects of the user interface 316 may be limited, or the user interface 316 may be removed entirely. The user interface 316 may be in communication with the memory 312, communication interface 314, and/or analysis module 318, such as via a bus.

The analysis module 318 may be embodied as various means, such as circuitry, hardware, a computer program product comprising a computer-readable medium (e.g., memory 312) storing computer-readable program instructions (e.g., software or firmware) that are executable by a suitably configured processing device (e.g., the processor 310), or some combination thereof and, in some example embodiments, is embodied as or otherwise controlled by the processor 310. In embodiments wherein the analysis module 318 is embodied separately from the processor 310, the analysis module 318 may be in communication with the processor 310. The analysis module 318 may further be in communication with one or more of the memory 312, communication interface 314, or user interface 316, such as via a bus.

In some example embodiments, the monitoring module 218 of a monitored apparatus 102 may be configured to implement and/or otherwise control one or more utilities, which may monitor activity of the monitored apparatus 102. In this regard, the monitoring module 218 may monitor activity occurring in real time, examine available data records detailing previous activity on the monitored apparatus 102, and/or the like. The monitoring module 218 may be configured to monitor activity periodically and/or otherwise in accordance with a schedule. The schedule may, for example, be defined by a task scheduler, which may be implemented by an operating system implemented on the monitored apparatus 102. As another example, the monitoring module 218 may be configured to monitor activity constantly, such as while operating in the background. As still a further example, the monitoring module 218 may be configured to monitor activity in response to a request or command received from the forensic analysis apparatus 104.

The monitoring module 218 may be configured to monitor activity in accordance with one or more predefined settings. The one or more predefined settings may include, for example, one or more defined activities to monitor, one or more defined activities to exclude from monitoring, one or more file paths to examine for activity, and/or the like.

The monitoring module 218 may be further configured to extract forensic data based at least in part on the monitored activity. Extraction of forensic data may consist of collection of forensic data into files and/or other data units, which may be distinct from the source on the system. The forensic data may consist of data (e.g., files, portions of files, and/or the like) which contain evidence of activity on the monitored apparatus 102. Forensic data may, for example, be extracted from operating system files (e.g., a registry), application files, memory (e.g., the memory 212), system RAM, removable storage devices, and/or the like.

In some example embodiments, the monitoring module 218 may be configured to extract forensic data by calling one or more forensic extractions utilities. The individual forensic extraction utilities may, for example, include custom coded programs, open source programs, commercial programs, and/or the like.

The monitoring module 218 may be configured to extract forensic data in accordance with one or more predefined settings. The setting may define one or more forensic extraction utilities to use and/or not use, paths to system media from which forensic data is to be extracted, settings for formatting and/or storing extracted forensic data, and/or the like.

The extracted forensic data (e.g., forensic artifacts) may include any number of forensic data types and may vary dependent on the type of system and/or applications implemented on the monitored apparatus 102. By way of non-limiting example, the extracted forensic data may, for example, include one or more of the following:

File system timeline
    App Paths registry key
    Autostarts/Run key contents from Software hive
    System event logs
    Application event logs
    Firewall Configuration settings IDE (Integrated Device Electronics) SCSI (Small Computer System Interface), and/or other storage details
Local Accounts and Recent Logins
Mounted Devices key from registry system hive
Malicious Removal Tool run info
NICs (Network Interface Controllers) from registry system hive
User profile info
Reboot History
Recycle/Trash Bin data
Deleted data
SAM (Security Accounts Manager) info
Security settings
Network Shares
Uninstall key from Software hive
USB (Universal Serial Bus) Devices and USB Storage Devices
Values from the WinLogon key
Operating System (e.g., Windows®) Current Version info
Kernel messages
Memory (e.g., RAM) contents
System configuration
    Apache or IIS (Internet Information Services) configuration
    Startup scripts
    Running processes
    Open network ports
    List of open files
Database configuration
Database history data
    Database schemas
    Event, Error, Transaction logs
    Recent queries
    Security settings
User activity data including
    User: List of local searches by user
    User: Recently open/saved
    User: Helper programs for file types accessed
    User: Installed software
    User: Control Panel applets run using .mmc files (10 lines in log)
    User: recent file list
    User: MMC (Microsoft® Management Console)—Recent File List
    User: Mapped network drives
    User: Mount points (Drives, Volumes, Remote Drives)
    User: Recent documents accessed
    User: Typed/visited URLs (Uniform Resource Locators)
    User: Programs that run when a user logs in
    User: Recently run programs The monitoring module 218 may be further configured to cause transfer of the extracted forensic data from the monitored apparatus 102 to the forensic analysis apparatus 104 for processing and analysis. The monitoring module 218 may, for example, be configured to cause secure transfer of the forensic data, such as by using hypertext transfer protocol secure (HTTPS), secure shell (SSH), or other secure protocol, so as to preserve integrity and a chain of custody of the forensic data. In some example embodiments, the monitoring module 218 may be configured to cause transfer of the forensic data to the forensic analysis apparatus 104 in accordance with one or more predefined parameters, which may for example, define a protocol to use for transfer of the forensic data, a schedule for transferring extracted forensic data, and/or other parameters or settings for data transfer.

In some example embodiments, the monitoring module 218 may, for example, be configured to periodically transfer extracted forensic data to the forensic analysis apparatus 104. As another example, the monitoring module 218 may be configured to transfer extracted forensic data to the forensic analysis apparatus 104 following conclusion of each activity monitoring and forensic data extraction session. As yet another example, the monitoring module 218 may be configured to cause transfer of extracted forensic data in response to a request from the forensic analysis apparatus 104. In this regard, it will be appreciated that forensic data may, for example, be pushed to the forensic analysis apparatus 104 by the monitored apparatus 102 and/or may be pulled from the monitored apparatus 102 by the forensic analysis apparatus 104.

The monitoring module 218 may be configured to retain (e.g., in the memory 212) extracted forensic data for at least a defined period of time. Alternatively, the monitoring module 218 may be configured to purge extracted forensic data after it has been transferred to the forensic analysis apparatus 104.

The analysis module 318 may be configured to receive forensic data from one or more monitored apparatuses 102 and may process the received forensic data. In some example embodiments, the analysis module 318 may be configured to process received forensic data based at least in part on the type of forensic data received. In this regard, the analysis module 318 may be configured to perform a processing procedure specific to each of a plurality of forensic data types. In processing forensic data, the analysis module 318 may be configured to preserve the forensic integrity of the data and may further maintain a chain of custody of the data, such that an origin and/or other forensic custody information for the data may be later identified.

In processing received forensic data, the analysis module 318 may be configured to perform one or more data transformations and/or derivations. For example, the analysis module 318 may be configured to extract a portion(s) of forensic data from a larger forensic data set(s), parse individual rows or records in received forensic data to extract or remove one or more particular characters, and/or the like. As another example, the analysis module 318 may be configured to convert values of received forensic data by application of a mathematical formula. As yet another example, the analysis module 318 may be configured to synthesize forensic data from multiple received forensic data sets and/or sources into a combined forensic data set. The analysis module 318 may additionally or alternatively be configured to compare and/or combine received forensic data to derive additional forensic data values. As still a further example, the analysis module 318 may be configured to process forensic data received in a linear format to a tabular delimited format including, for example, comma-separated values, tab-separated values, or the like.

In some example embodiments, the analysis module 318 may be further configured to archive the processed forensic data in a forensic database (e.g., a relational database). Loading the processed forensic data into the database may involve additional processing and/or transformation to format the forensic data for the database. By way of example, the analysis module 318 may be configured to perform a differential comparison of forensic data to identify new or changed data points. As another example, the analysis module 318 may be configured to perform data conversions, such as, date/time conversions (e.g., converting a Unix Epoch time value a human-readable date/time stamp). As a further example, the analysis module 318 may be configured to create and/or derive additional values from values of the processed forensic data.

The analysis module 318 may be further configured to perform at least a high level preliminary analysis of the processed forensic data. Values, data, and/or other information resulting from this analysis may also be loaded into the forensic database. As an example, the analysis module 318 may analyze the data (e.g., recently processed forensic data, data previously added to the database, some combination thereof, or the like) to identify changes in specific data points over time. As another example, the analysis module 318 may be configured to compare forensic data values to known bad and/or good values to produce additional derived values and/or status indications.

As a further example, the analysis module 318 may calculate or otherwise generate key risk indicator (KRI) values (e.g., PASS/WARN/FAIL, a numeric score value, and/or the like) from processed forensic data. As an example scenario, a client may specify that no new user accounts should be created on a monitored system, and that any new user account is a significant risk. This rule may be applied during processing of received forensic data, and if the forensic data contains an indication of a creation of a new user account, the analysis module 318 may set a KRI value for "New User Creation" to "FAIL." The analysis module 318 may further flag data representing evidence of the created user account.

The analysis module 318 may be further configured to generate a report(s) based at least in part on processed forensic data. In some example embodiments wherein processed forensic data is maintained in a forensic database, a generated report may connect to and/or otherwise present data from the forensic database.

The analysis module 318 may, for example, be configured to perform report generation automatically (e.g., periodically). As another example, the analysis module 318 may be configured to generate a report in response to detection of an incident on a monitored apparatus 102, detection of a predefined KRI value, an intrusion, and/or the like. In some example embodiments, the analysis module 318 may be configured to generate a report in response to a user request.

The analysis module 318 may be configured to cause a generated report to be provided to a system administrator, investigator, and/or other user for review and analysis. As an example, a report may be displayed on a display for user review. As another example, the analysis module 318 may be configured in some example embodiments to cause distribution of a generated report or other notification to one or more users, such as via email, text message, and/or the like. In such embodiments, the analysis module 318 may be configured to deliver a report in accordance with a schedule (e.g., at an appointed day/time) with or without recurrence.

As a further example, in some example embodiments, the analysis module 318 may provide a network interface (e.g., a Web portal) by which a user may request and view a report (e.g., on demand). In such example embodiments, a user may be required to log in to the interface to verify that he is authorized to access and view forensic report. Upon login, the user may be offered a menu of reports available to the user. The user may accordingly select one or more reports for generation and/or viewing.

It will be appreciated that the analysis module 318 may be configured to generate any of a variety of standard and/or custom reports. By way of non-limiting example, the analysis module 318 may be configured to generate one or more of the following reports:

File system activity timeline
Web browsing activity
USB and USB Storage Information
User login activity (successful, failed)
Users created/deleted
Users and group memberships
Network interface properties
System attributes
   Autostarts
   Reboots
   Firewall configuration
   New applications installed A generated report may, for example, include output of analysis using standard and/or customized formulas measuring levels of potential risk of compromise or intrusion. Individual measurements of risk can be expressed using "key risk indicators", whereby formulas may assess forensic data either on individual monitored times or across multiple times, and return a risk indication value. The risk indication value may, for example, comprise one of PASS (e.g., no indication of risk detected), WARN (e.g., possible indication of risk detected) or FAIL (e.g., likely or definite indication of risk detected).

In some example embodiments, the analysis module 318 may be configured to generate a per-system (e.g., a single monitored apparatus 102) report. A per-system report may, for example, provide data reporting of one or more monitored forensic artifacts at a single time or across multiple times. As another example, a per-system report may provide data reporting of a differential between different monitored times (e.g., change over time) for a given artifact or artifacts. A per-system report may, for example, provide a tabular and/or chart representation of forensic data.

Additionally or alternatively, the analysis module 318 may be configured to generate an aggregate report reporting on forensic data extracted from a plurality of monitored apparatuses 102 (e.g., on a system-wide basis). An aggregate report may, for example, provide data reporting of a given artifact or artifacts across multiple systems, for a single time or across multiple times. As another example, an aggregate report may provide data reporting of a given artifact or artifacts across a period of time (e.g., change over time). As still a further example, an aggregate report may provide forensic data for a given user (e.g., user activity data) over a period of time across a plurality of monitored apparatuses 102, and/or the like. It will be appreciated, however, that reporting of a given forensic artifact or artifacts may be across any dimension, including, for example, time, network status, user, or other factor internal or external to the forensic data.

In some example embodiments, the analysis module 318 may be configured to generate interactive reports, which may include one or more user-interactive properties. By way of non-limiting example, such interactive properties may include date parameterization, filtering by record attributes, dynamic sorting highlighting of suspicious or flagged rows, differential between multiple monitored dates/times, some combination thereof, or the like.

In some example embodiments, a report may include a main dashboard. The dashboard may include values for KRIs, aggregate measures, and/or the like, which may, for example, be expressed as text, graphics, charts, tables, and/or the like. The dashboard may provide access (e.g., hyperlinks) to more detailed reports, differential reports, and/or the like so that forensic data underlying aggregated and calculated values may be examined.

Figure 4:
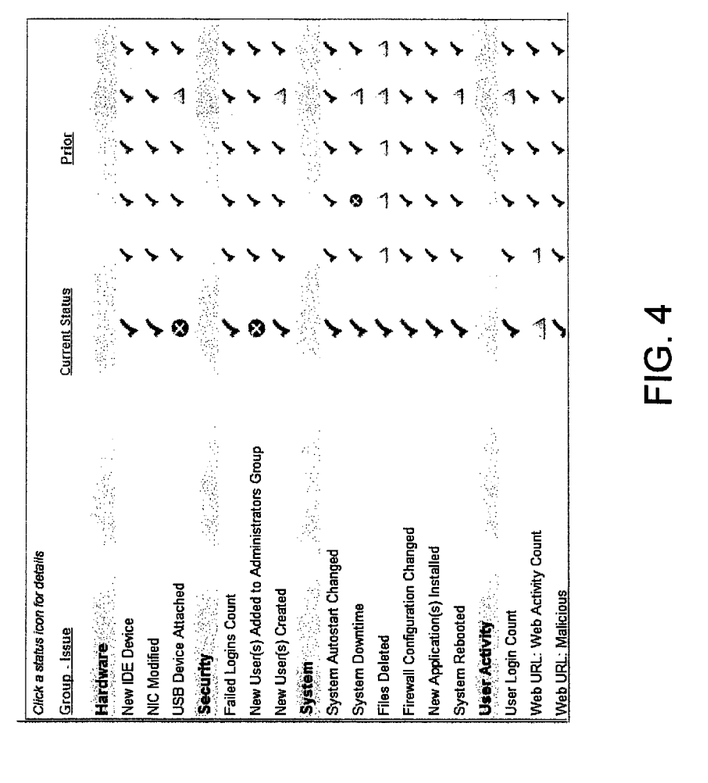
FIGS. 4-5 illustrate example forensic reports that may be generated in accordance with some example embodiments.
Figure 5:
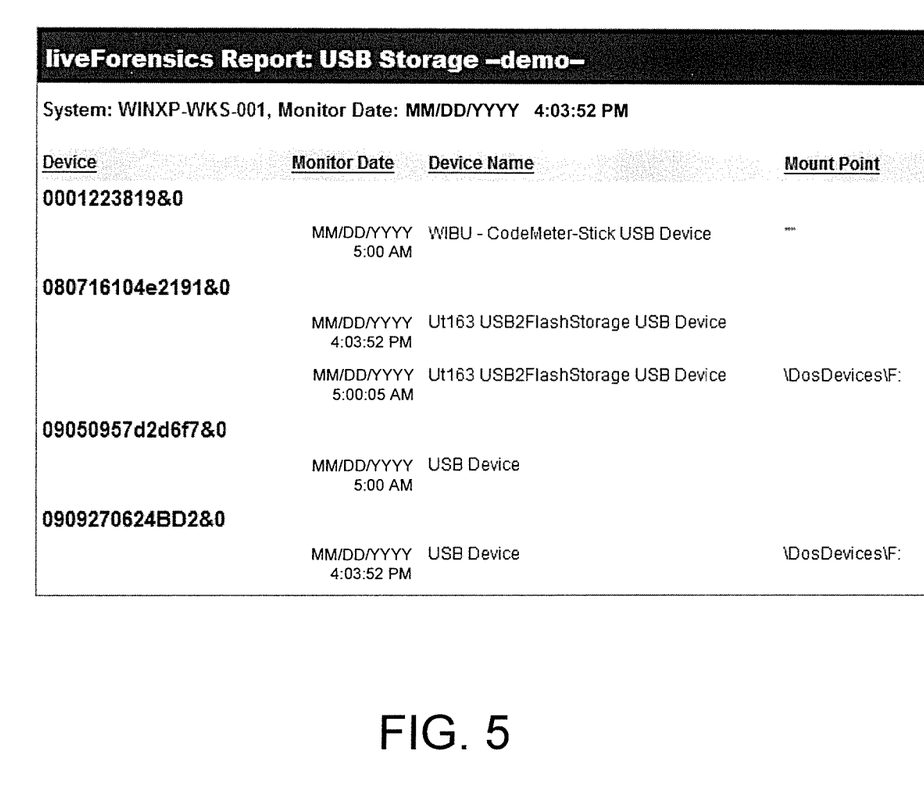

Referring now to FIG. 4, an example high level dashboard report is shown that may be generated and presented in accordance with some example embodiments. The dashboard includes a tabular representation with graphical indications of KRI values for a variety of forensic categories. A more detailed report may be accessed for one or more of the forensic categories presented in the dashboard. In this regard, FIG. 5 illustrates an example detailed forensic report for a USB storage device that may be accessed from the dashboard of FIG. 4.

Figure 6:
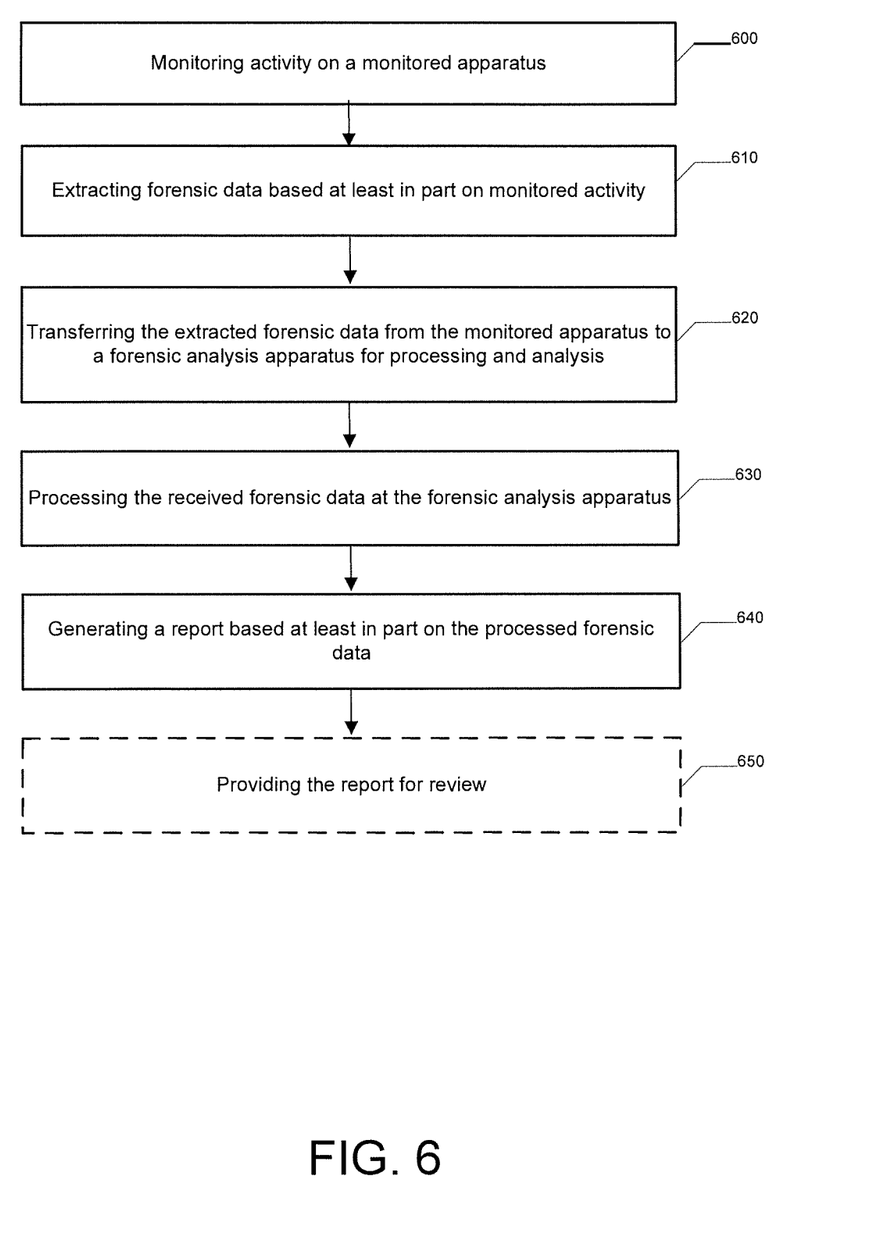
FIG. 6 illustrates a flowchart according to an example method for forensic monitoring according to some example embodiments.

Referring now to FIG. 6, a flowchart is shown according to an example method for forensic monitoring, such as may be performed by the system 100, according to some example embodiments. Operation 600 may comprise monitoring activity on a monitored apparatus 102. The monitoring may be scheduled to occur periodically, may be performed in response to instruction from the forensic analysis apparatus 104, may be performed (e.g., in the background) constantly, or the like. Operation 610 may comprise extracting forensic data based at least in part on monitored activity. Operation 620 may comprise the monitored apparatus 102 transferring the extracted forensic data from the monitored apparatus to the forensic analysis apparatus 104 for processing and analysis. The forensic analysis apparatus 104 may process the received forensic data, at operation 630. Operation 630 may optionally include archiving the processed forensic data in a database. Operation 640 may comprise the forensic analysis apparatus 104 generating a report based at least in part on the processed forensic data, at operation 640. Operation 640 may, for example, be performed automatically; responsive to detection of an incident, a key risk indicator, an intrusion, or the like; in response to a user request, and/or the like. The method may optionally further comprise the forensic analysis apparatus 104 providing the report for review, at operation 650.

Figure 7:
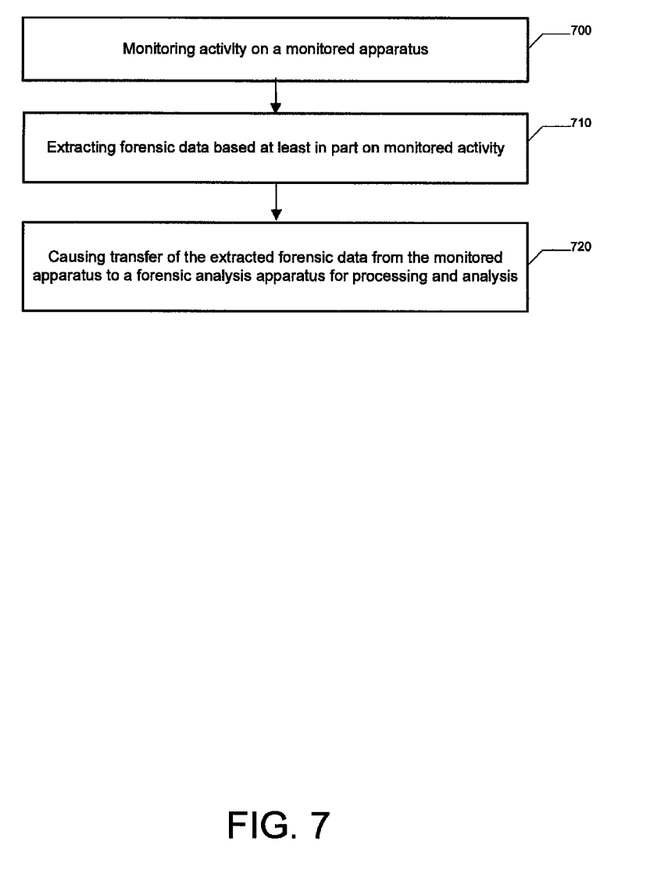
FIG. 7 illustrates a flowchart according to an example method for forensic monitoring according to some example embodiments.

FIG. 7 illustrates a flowchart according to an example method for forensic monitoring according to some example embodiments. In this regard, FIG. 7 illustrates operations that may, for example, be performed by a monitored apparatus 102. The operations illustrated in and described with respect to FIG. 7 may, for example, be performed by, with the assistance of, and/or under the control of one or more of the processor 210, memory 212, communication interface 214, user interface 216, or monitoring module 218. Operation 700 may comprise monitoring activity on a monitored apparatus 102. The monitoring may be scheduled to occur periodically, may be performed in response to instruction from the forensic analysis apparatus 104, may be performed (e.g., in the background) constantly, and/or the like. The processor 210, memory 212, communication interface 214, user interface 216, and/or monitoring module 218 may, for example, provide means for performing operation 700. Operation 710 may comprise extracting forensic data based at least in part on monitored activity. The processor 210, memory 212, and/or monitoring module 218 may, for example, provide means for performing operation 710. Operation 720 may comprise causing transfer of the extracted forensic data to the forensic analysis apparatus 104 for processing and analysis. The processor 210, memory 212, communication interface 214, and/or monitoring module 218 may, for example, provide means for performing operation 720.

Figure 8:
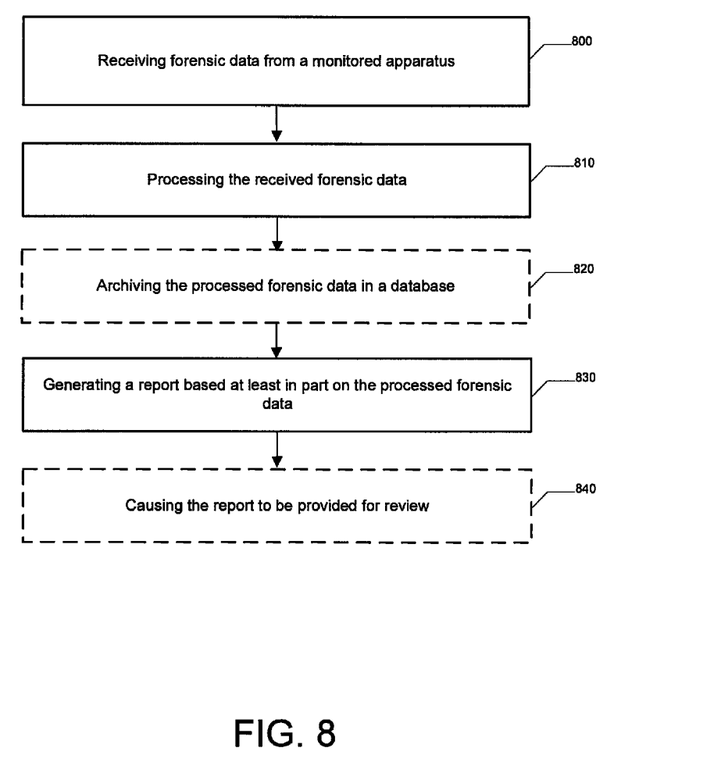
FIG. 8 illustrates a flowchart according to an example method for forensic analysis according to some example embodiments.

FIG. 8 illustrates a flowchart according to an example method for forensic analysis according to some example embodiments. In this regard, FIG. 8 illustrates operations that may, for example, be performed by a forensic analysis apparatus 104. The operations illustrated in and described with respect to FIG. 8 may, for example, be performed by, with the assistance of, and/or under the control of one or more of the processor 310, memory 312, communication interface 314, user interface 316, or analysis module 318. Operation 800 may comprise receiving forensic data from a monitored apparatus 102. The processor 310, memory 312, communication interface 314, and/or analysis module 318 may, for example, provide means for performing operation 800. Operation 810 may comprise processing the received forensic data. The processor 310, memory 312, and/or analysis module 318 may, for example, provide means for performing operation 810. The method may optionally further include archiving the processed forensic data in a database, at operation 820. The processor 310, memory 312, communication interface 314, and/or analysis module 318 may, for example, provide means for performing operation 820. Operation 830 may comprise generating a report based at least in part on the processed forensic data. Operation 830 may, for example, be performed automatically; responsive to detection of an incident, a key risk indicator, an intrusion, or the like; in response to a user request, and/or the like. The processor 310, memory 312, communication interface 314, and/or analysis module 318 may, for example, provide means for performing operation 830. The method may further comprise operation 840, which may comprise causing the report to be provided for review. The processor 310, memory 312, communication interface 314, user interface 316, and/or analysis module 318 may, for example, provide means for performing operation 840.

FIGS. 6-8 each illustrate a flowchart of a system, method, and computer program product according to example embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices (e.g., the memory 212 and/or 312) of a server, desktop computer, laptop computer, mobile computer, or other computing device (e.g., a monitored apparatus 102, a forensic analysis apparatus 104, some combination thereof, and/or the like) and executed by a processor (e.g., the processor 210 and/or processor 310) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function(s) specified in the flowchart block(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although other modifications and changes may be suggested by those skilled in the art, it is the intention of the inventors to embody within the patent warranted hereon all changes and modifications as reasonably and properly come within the scope of their contribution to the art.

I claim:

1. A computer implemented method for forensic monitoring, comprising:
    monitoring, by a monitoring module of a monitored apparatus, activity on the monitored apparatus;
    extracting, by a processor, forensic data from the monitored apparatus based at least in part on the monitored activity, the forensic data including one or more point-in-time views of system state of the monitored apparatus;
    causing transfer, via a network, of the extracted forensic data from the monitored apparatus to a forensic analysis apparatus configured to archive the forensic data for a later analysis;
    preserving integrity of the extracted forensic data;
    preserving chain of custody information of the extracted forensic data; and
    causing the forensic analysis apparatus to determine one or more key risk indicator values relating to the monitored apparatus based at least in part on the later analysis by applying one or more rules to the extracted forensic data, wherein the key risk indicator values indicate potential risks of intrusion caused by activity occurring on the monitored apparatus.

2. The method of claim 1, wherein extracting forensic data and causing transfer of the extracted forensic data are performed automatically on a scheduled basis.

3. The method of claim 1, wherein data integrity of the extracted forensic data and the chain of custody information of the extracted forensic data are preserved during transfer of the extracted forensic data through secure transfer of the forensic data from the monitored apparatus to the forensic analysis apparatus.

4. The method of claim 1, wherein extracting the forensic data comprises extracting the forensic data from one or more files containing evidence of activity on the monitored apparatus.

5. The method of claim 4, wherein extracting the forensic data from the one or more files containing evidence of activity on the monitored apparatus comprises extracting the forensic data from an operating system file.

6. The method of claim 1, wherein the forensic analysis apparatus is further configured to process the forensic data transferred to the forensic analysis apparatus and generate a report based at least in part on the processed forensic data.

7. The method of claim 1, wherein:
    extracting the forensic data and causing transfer of the extracted forensic data are performed automatically on a scheduled basis;
    data integrity of the extracted forensic data and the chain of custody information of the extracted forensic data are preserved during transfer of the extracted forensic data through secure transfer of the forensic data from the monitored apparatus to the forensic analysis apparatus; and
    the forensic analysis apparatus is further configured to process the forensic data transferred to the forensic analysis apparatus and generate a report based at least in part on the processed forensic data.

8. An apparatus for forensic monitoring, the apparatus comprising at least one processor and at least one memory storing computer program instructions that, when executed by the at least one processor, cause the apparatus to at least:
    monitor, by a monitoring module of the apparatus, activity on the apparatus;
    extract forensic data from the apparatus based at least in part on the monitored activity, the forensic data including one or more point-in-time views of system state of the apparatus;
    cause transfer, via a network, of the extracted forensic data from the apparatus to a forensic analysis apparatus configured to archive the forensic data for later analysis by applying one or more rules to the extracted forensic data;
    preserve integrity of the extracted forensic data;
    preserve chain of custody information of the extracted forensic data; and cause determination, by the forensic analysis apparatus, of one or more key risk indicator values relating to the apparatus based at least in part on the later analysis, wherein the key risk indicator values indicate potential risks of intrusion caused by activity occurring on the apparatus.

9. The apparatus of claim 8, wherein the computer program instructions, when executed by the at least one processor, further cause the apparatus to extract forensic data and cause transfer of the extracted forensic data automatically on a scheduled basis.

10. The apparatus of claim 8, wherein the computer program instructions, when executed by the at least one processor, further cause the apparatus to preserve data integrity of the extracted forensic data and to preserve chain of custody of the extracted forensic data during transfer of the extracted forensic data through secure transfer of the forensic data from the apparatus to the forensic analysis apparatus.

11. The apparatus of claim 8, wherein the computer program instructions, when executed by the at least one processor, further cause the apparatus to extract forensic data at least in part by extracting forensic data from one or more files containing evidence of activity on the apparatus.

12. The apparatus of claim 11, wherein the computer program instructions, when executed by the at least one processor, further cause the apparatus to extract forensic data from an operating system file.

13. The apparatus of claim 8, wherein the computer program instructions, when executed by the at least one processor, further cause the apparatus to cause the forensic analysis apparatus to process the forensic data transferred to the forensic analysis apparatus and generate a report based at least in part on the processed forensic data.

14. A computer implemented method for forensic analysis, comprising:
receiving, at a forensic analysis apparatus, forensic data transferred, via a network, from a monitored apparatus to the forensic analysis apparatus, the forensic data comprising forensic data extracted from the monitored apparatus, by a monitoring module of the monitored apparatus, and based at least in part on monitored activity associated with the monitored apparatus, wherein the forensic data includes one or more point-in-time views of system state of the monitored apparatus;
archiving the forensic data for later analysis, wherein archiving the received forensic data is performed under control of a processor;
preserving integrity of the received forensic data;
preserving chain of custody information of the extracted forensic data; and
determining, by the apparatus, one or more key risk indicator values relating to the monitored apparatus based at least in part on the later analysis by applying one or more rules to the extracted forensic data, wherein the key risk indicator values indicate potential risks of intrusion caused by activity occurring on the monitored apparatus.

15. The method of claim 14, wherein receiving the forensic data comprises receiving forensic data securely transferred from the monitored apparatus to the forensic analysis apparatus to preserve data integrity and the chain of custody information of the forensic data.

16. The method of claim 14, further comprising:
processing the received forensic data to generate a processed set of forensic data;
wherein archiving the forensic data comprises archiving the processed set of forensic data.

17. The method of claim 14, further comprising:
analyzing the forensic data; and
generating a report based at least in part on the analysis of the forensic data.

18. The method of claim 17, wherein generating the report comprises generating a report including the determined key risk indicator values.

19. The method of claim 17, wherein receiving the forensic data comprises receiving forensic data securely transferred from the monitored apparatus to the forensic analysis apparatus to preserve data integrity and the chain of custody information of the forensic data, the method further comprising:
processing the received forensic data to generate a processed set of forensic data;
wherein archiving the forensic data comprises archiving the processed set of forensic data, wherein analyzing the forensic data comprises analyzing the processed set of forensic data.

20. An apparatus for forensic analysis, the apparatus comprising at least one processor and at least one memory storing computer program instructions that, when executed by the at least one processor, cause the apparatus to at least:
receive forensic data transferred, via a network, from a monitored apparatus to the apparatus, the forensic data comprising forensic data extracted from the monitored apparatus, by a monitoring module of the monitored apparatus, and based at least in part on monitored activity associated with the monitored apparatus, wherein the forensic data includes one or more point-in-time views of system state of the monitored apparatus;
archive the forensic data for later analysis;
preserve integrity of the extracted forensic data;
preserve chain of custody information of the extracted forensic data; and
determine, by the apparatus, one or more key risk indicator values relating to the monitored apparatus based at least in part on the analysis by applying one or more rules to the extracted forensic data, wherein the key risk indicator values indicate potential risks of intrusion caused by activity occurring on the monitored apparatus.

21. The apparatus of claim 20, wherein the computer program instructions, when executed by the at least one processor, further cause the apparatus to receive the forensic data by receiving forensic data securely transferred from the monitored apparatus to the forensic analysis apparatus to preserve data integrity and the chain of custody information of the forensic data.

22. The apparatus of claim 20, wherein the computer program instructions, when executed by the at least one processor, further cause the apparatus to:
process the received forensic data to generate a processed set of forensic data; and
archive the forensic data at least in part by archiving the processed set of forensic data.

23. The apparatus of claim 20, wherein the computer program instructions, when executed by the at least one processor, further cause the apparatus to:
analyze the forensic data; and
generate a report based at least in part on the analysis of the forensic data.

24. The apparatus of claim 23, wherein the computer program instructions, when executed by the at least one processor, further cause the apparatus to generate the report at least in part by generating a report including the determined key risk indicator values.

25. A computer implemented method for forensic monitoring, comprising:
   monitoring, by a monitoring module of a monitored apparatus, activity on the monitored apparatus;
   extracting, by a processor, forensic data from the monitored apparatus based at least in part on the monitored activity, the forensic data including one or more point-in-time views of system state of the monitored apparatus;
   causing transfer, via a network, of the extracted forensic data from the monitored apparatus to a forensic analysis apparatus configured to archive the forensic data for a later analysis;
   preserving integrity of the extracted forensic data;
   preserving chain of custody information of the extracted forensic data,
   wherein the extracted forensic data includes at least one of: file system timeline, application path registry key, autostart and run key contents from software hive, system event logs, application event logs, firewall configuration settings, IDE (Integrated Device Electronics) SCSI (Small Computer System Interface) details, local accounts and recent logins, mounted devices key from registry system hive, malicious removal tool run information, NICs (Network Interface Controllers) from registry system hive, user profile info, reboot history, recycle/trash Bin data, deleted data, SAM (Security Accounts Manager) info, security settings, network shares, uninstall key from software hive, USB (Universal Serial Bus) Devices and USB Storage Devices, values from the WinLogon key, operating system version information, kernel messages, memory contents, system configuration, Apache or IIS (Internet Information Services) configuration, Startup scripts, running processes, open network ports, list of open files, database configuration, database history data, database schemas, event and error and transaction logs, recent queries, security settings, and user activity data; and
   determining, by the forensic analysis apparatus, one or more key risk indicator values relating to the monitored apparatus based at least in part on the later analysis by applying one or more rules to the extracted forensic data, wherein the key risk indicator values indicate potential risks of intrusion caused by activity occurring on the monitored apparatus.

* * * * *